UNITED STATES PATENT OFFICE 2,320,826

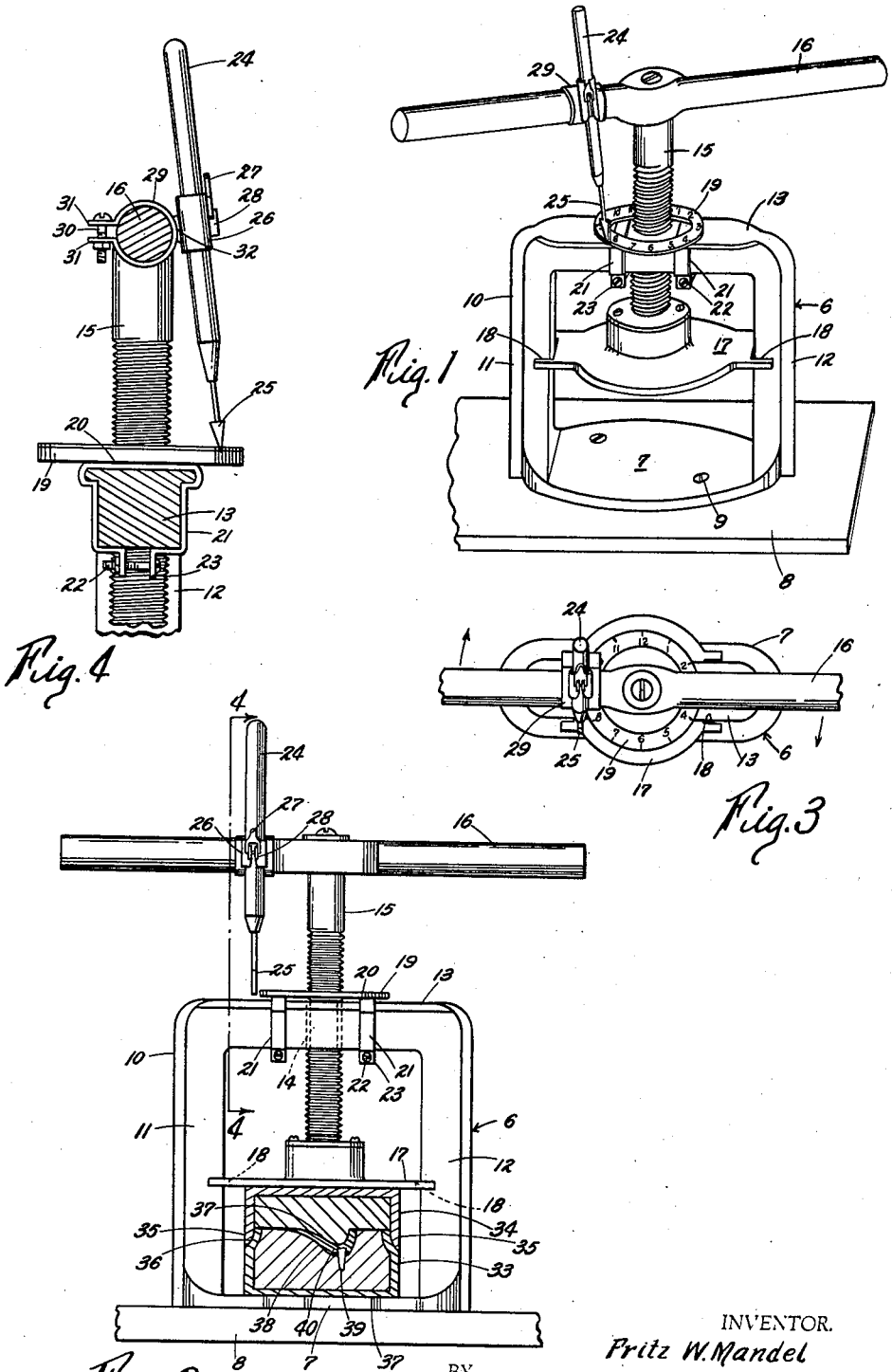

METHOD AND MEANS FOR MAKING DENTAL PLATES

Fritz W. Mandel, Cincinnati, Ohio, assignor of one-half to Frank Schaefer, Cincinnati, Ohio Application July 11, 1942, Serial No. 450,603

6 Claims. (Cl. 18—33)

The present invention relates to dental presses and is particularly directed to a method and means for obtaining a predetermined mass of moldable denture material within a dental flask by a succession of press operations upon said flask and the changing of the mass between each press operation until said predetermined mass is obtained.

It is the present practice in the manufacture of dental plates to prepare a trial plate which has false teeth embedded in a wax form. The proportions of this trial plate are determined by placing it in a patient's mouth until it fits perfectly therein. The actual dental appliance for the patient should closely duplicate the proportions of the trial plate and said trial plate is therefore used as a model from which the dental appliance is made. To this end said trial plate is placed in a two-part flask and its impression taken in impressionable material held in both parts of the flask, the teeth of the trial plate being imbedded in the impressionable material in one part of said flask. The impressionable material, such as plaster of Paris, is then allowed to harden and after hardening the flask is opened and the wax portion of the trial plate is removed and a moldable denture material is inserted in the impression made by the wax. Heretofore, the amount of moldable material to be added was determined by the skill and experience of the operator and quite frequently the resultant dental appliance was either larger or smaller than the trial plate which it should have duplicated. After the moldable dental material was substituted for the trial plate the flask was subjected to a pressing operation to compress and distribute said material in the impression and after said pressing operation the flask was subjected to a curing process, thus completing the dental appliance.

Applicant's herein described invention is directed to a method and means for the manufacture of a dental appliance which positively produces an appliance which is the exact duplicate of the trial plate by providing an indicator and method of using it which shows the exact position of the press parts during successive pressing operations upon a particular type of flask.

It is therefore an object of this invention to provide a method and means for producing a finished dental appliance which is a duplicate of the trial plate.

Another object of the invention is to provide a simplified means for obtaining a predetermined amount of moldable denture material in a dental flask by subjecting said dental flask to a succession of controlled pressing operations.

Other objects of the invention are to provide an adjustable indicator means for the press parts to allow for differences in flask sizes; to facilitate cleaning of the press indicating gauge; to provide a simplified means which may be inexpensively attached to various types of presses; and to provide an efficient means of carrying out the steps of the herein described method of making dental appliances.

Other objects will be apparent from the following specification and claims, reference now being made to the drawing, in which:

Fig. 1 is a perspective view of a dental press with the indicating means positioned thereon for carrying out my method.

Fig. 2 is a side elevational view of the dental press shown in Fig. 1, the dental flask and its contents being shown in cross-section.

Fig. 3 is a fragmental plan view of the press illustrated in Fig. 2.

Fig. 4 is an enlarged cross-sectional view taken on line 4—4 of Fig. 2.

The dental press 6 has a flat base 7 fastened to a support such as a table 8 by screws 9 and provided with an inverted U-shaped yoke 10 having integral side members 11 and 12 which are connected at their upper ends by a cross member 13 The cross member is provided with a centrally disposed threaded hole 14 for receiving a vertically disposed threaded shaft 15 which constitutes a part of the rotatable pressure means for the press. The pressure means is provided at its upper end with a handle 16 while the lower end of said shaft is rotatably fastened to a vertically movable pressure plate 17 movable toward and away from the base when the handle is manually rotated. The plate is precluded from rotation by means of U-shaped openings 18 formed in opposite sides thereof which freely receive the side members 11 and 12 of the press.

The indicating means for determining the exact position of the press parts during successive pressing operations consists of a circular dial 19 preferably graduated in a clockwise direction into twelve equal parts. The dial encircles the shaft 15 and is disposed concentrically therewith. The dial may be fastened to the cross member 13 of the yoke by two straps 21 which are soldered at 20 to the underside of the dial and which transversely encircle said cross member and are clamped thereto by means of screws 22 engaging flanges 23 formed at the ends of the straps 21.

A pointer 24 is mounted on a rotatable element of the pressure means, such as the handle 16, with its depending end 25 disposed adjacent the periphery of the dial. A clockwise motion of the handle is adapted to move the pressure means downwardly to exert pressure on a dental flask positioned on the base. The pointer is vertically adjustable relative to the handle to preclude contact of the pointer with the cross member 13 of the press when said press is operating on flasks of various vertical dimensions. The central portion of the pointer is encircled by a split sleeve 26 which is clamped to said pointer by a camming lever 27 engaging flanges 28 formed on the adjacent edges of the sleeve. The sleeve is rigidly fastened to the handle by a clamp 29 which transversely embraces it and is clamped thereto by a screw 30 running through flanges 31 formed on the ends of the clamp, said clamp being soldered to the sleeve at 32 (Fig. 4).

As shown in Fig. 2 in cross section, a two part dental flask 33 is positioned in the press for a pressure operation and has a cap portion 34 provided with depending guides 35 which cooperate with guideways 36 formed in the lower portion 37 of the flask. As illustrated in the drawing, an initially impressionable material such as unset plaster of Paris has been given the set impression 37 of the patient's mouth obtained from the trial plate while the lower portion 37 has the configuration of the outer surface 38 of the dental plate, the false teeth 39 being shown extending into the plaster of Paris held in the lower section and extending into the denture material 40 of the dental appliance. The method of using my indicating means in conjunction with a dental press to make a final dental appliance identical with the trial plate will now be described:

The wax trial plate with the final teeth positioned therein is placed in the flask and surrounded with unset plaster of Paris, said plaster of Paris being separated at the division line between the cap and lower section of the flask by any well known means. The flask 33 is then placed in the press 6 and a pressure applied thereon by manually rotating the handle of the pressure means 15. When said pressure has been applied to the flask, it is held in the press until the plaster has hardened and at the same time the position of the pointer 24 relative to the dial is noted and a record is made of said number which is termed herein the base number. This base number indicates the position of the press parts for the particular flask operated upon. After the plaster has hardened, the flask is removed from the press and opened; whereupon the wax is removed from the lower section of the flask leaving the impression 37 of the patient's mouth in the cap of the flask and the outer impression 38 of the final dental appliance in said lower section. Moldable denture material is then inserted in the impression made by the wax portion of the trial plate and the flask is then closed and again returned to the press and a predetermined pressure is exerted on the flask sufficient to compress and distribute the denture material in said impression. The position of the pointer relative to the dial is then noted and a reference number indicative of the position of the press parts is gotten. This reference number is then referred to the base number to determine whether the movable press parts are in the exact position that they occupied in the initial press operation on the flask. If the reference number is less than the base number it is obvious that too much moldable denture material has been added to the impression of the trial plate in the flask. On the other hand, if the base number is reached without sufficient resistance from the flask under the predetermined pressure, it is an indication that not enough denture material has been added to the flask. In either event the flask is removed from the press and denture material is added or removed from the mold in the flask in accordance with the foregoing result and the flask is returned to the press. The predetermined pressure is again exerted on the flask and the reference number obtained is again compared with the base number. A succession of these trial press operations are performed until the reference number and the base number coincide under the predetermined pressure, in which event the operator knows that the exact amount of denture material is in the impression of the trial plate and the flask is then subjected to a curing operation.

What is claimed is:

1. The herein described method of making a dental appliance which consists in placing a trial plate in a separable two-part flask filled with impressionable material, initially subjecting the flask to a pressing operation until the material has hardened, obtaining a base number indicative of the position of the press parts in the initial pressing operation, removing the trial plate material from the flask, inserting moldable denture material in the impression made by the trial plate material, again subjecting the flask to a second pressing operation by exerting a predetermined pressure thereon, obtaining a reference number indicative of the position of the press parts, comparing the reference number to the base number to determine the exact amount of denture material added to the impression in the flask, subjecting the flask to a number of pressing operations and changing the mass of moldable denture material in said flask after each pressing operation until the reference number for a pressing operation coincides with the base number under said predetermined pressure, and then subjecting the flask to a curing operation.

2. The herein described method of making a dental appliance which consists in placing a trial plate in a separable two-part flask filled with impressionable material, initially subjecting the flask to a pressing operation until the material has hardened, obtaining a base number indicative of the position of the press parts in the initial pressing operation, removing the trial plate material from the flask, inserting moldable denture material in the impression made by the trial plate material, again subjecting the flask to a second pressing operation by exerting a predetermined pressure thereon, obtaining a reference number indicative of the position of the press parts, comparing the reference number to the base number to determine the exact amount of moldable denture material added to the impression in the flask, altering the amount of moldable denture material after each of a succession of press operations on the flask until the reference number for a press operation coincides with the base number under said predetermined pressure, and then subjecting the flask to a curing operation.

3. In a dental press the combination of a base, a yoke on the base, a pressure means mounted on the yoke and movable toward and away from the base, a handle for the pressure means, a graduated dial mounted on the yoke, and a pointer fastened to the pressure means with its end disposed adjacent the dial.

4. In a dental press the combination of a base, a yoke on the base, a pressure means movable toward and away from the base, a rotatable element for the pressure means threadedly mounted on the yoke, a handle for the rotatable element, a circular dial mounted on the yoke and surrounding the rotatable element, and a pointer fastened on the handle with its end disposed adjacent the periphery of the dial.

5. In a dental press the combination of a base, a yoke upon the base, a screw pressure means mounted on the yoke and vertically movable toward and away from the base, a handle for the pressure means, a circular dial mounted upon the yoke concentric with the screw pressure means, and a pointer fastened on the handle with its end disposed adjacent the periphery of the dial.

6. In a dental press the combination of a base, a yoke upon the base, a screw pressure means mounted on the yoke and vertically movable toward and away from the base, a handle for the pressure means, a circular dial mounted upon the yoke concentric with the screw pressure means, a pointer mounted on the handle with its end disposed adjacent the periphery of the dial, and means for vertically adjusting the pointer on the handle.

FRITZ W. MANDEL.